Oct. 27, 1942.  E. F. FLINT  2,300,251
VARIABLE FOCUS LENS
Filed Jan. 23, 1941

EDWARD F. FLINT
INVENTOR
BY
ATTORNEYS

Patented Oct. 27, 1942

2,300,251

UNITED STATES PATENT OFFICE 2,300,251

VARIABLE FOCUS LENS

Edward F. Flint, Brighton, N. Y., assignor to Bausch & Lomb Optical Company, Rochester, N. Y., a corporation of New York Application January 23, 1941, Serial No. 375,646

1 Claim. (Cl. 88—57)

My invention has reference to lenses and more particularly is concerned with lenses of the variable focus type.

Several types of variable focus lens of the prior art employ two transparent diaphragms of some suitable curved shape, usually spherical segments, which are mounted in a frame, the space enclosed between them being filled with a clear liquid. In one of these types of lens, changes in the surface curvature of the diaphragms are effected by contracting or compressing their retaining frame. In another type of lens, changes in the curvature of the refracting surfaces are brought about by varying the volume and hence the internal pressure of the fluid used in the compartment formed between the diaphragms.

Both of the lenses described may be justly criticized on the ground that they are rendered ineffective by aberrations which are created when any considerable change in the focus is made. This is due to extreme unsymmetrical deformation received by each diaphragm for focus changes and is the result of unsuitable provision for permitting a change of diaphragm area sufficient to compensate for a variation made in its radius of curvature while changing the focal length of the lens. However, efforts to vary both of these factors, namely, surface curvature or shape and surface area, have been greatly limited by reason of the constructional design and constructional materials heretofore utilized for variable focus lenses.

My invention hence has a major object, the provision of a variable focus lens which lacks those defects and disadvantages inherent in devices of the prior art.

An equally important object is to provide a novel variable focus lens wherein a lens mounting member having an opening is divided into one or more compartments, each adapted to contain a fluid, by a rigid transparent lens element and one or more elastic transparent diaphragms which serve as closures for the opening, a source of fluid supply for each compartment and pressure actuated means being employed for varying the volume and the pressure of the fluid within the compartment so as to deform any diaphragm at will.

Another object is to provide a variable focus lens having one or more highly elastic diaphragms formed of molded plastic material which is of a transparent nature.

A further object of the invention resides in the provision of a variable focus lens which utilizes one or more elastic diaphragms of transparent sheet material which varies in thickness.

Yet a further object of my invention is to make use of a construction which permits correction of a variable focus lens for spherical and chromatic aberration within the focal range of the lens.

With these and other objects in view which may be incident to my improvements, the invention consists in the parts and combinations to be hereinafter set forth and claimed, with the understanding that the several necessary elements comprising my invention may be varied in construction, proportion and arrangement without departing from the spirit of the invention or exceeding the scope of the appended claims.

In order to make my invention more clearly understood, I have shown in the accompanying drawing means for carrying the same into practical effect without limiting the improvements in their useful applications to the particular constructions which, for the purpose of explanation, have been made the subject of illustration. To this end the invention is disclosed in the following manner, wherein.

Figure 1:
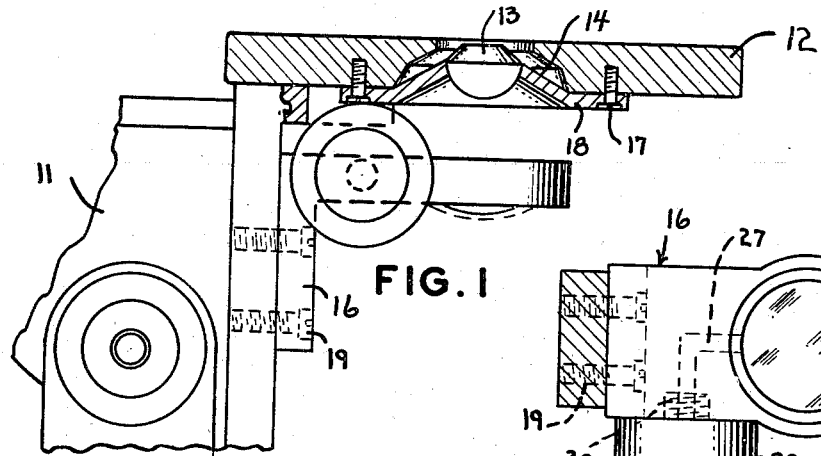
Figure 1 is a fragmentary side view, partially in section, of a microscope having the lens of my invention mounted thereon.

Referring to the drawing in which like reference characters designate similar parts throughout the several views, there is shown in Figure 1 a microscope having a stand 11 which supports the usual stage or object support 12. Any suitable and usual means, not shown, are employed for directing light from a source of illumination through a condenser employed with the microscope and towards the stage 12.

The condenser provided with the microscope prises in this instance a front lens 13 mounted in a holder 14 and a back lens carried in a mounting member or holder 16 which is separate from the front lens holder and is located below it.

The front lens 13, which is the usual hemisphere of glass or other suitable refracting material, is seated in its lens holder 14 and may be retained in its seat by any suitable means such, for example, as by spinning over the edge of the holder against the lens in the manner indicated. An enlarged tapered opening having a cylindrical portion, which latter is located adjacent the support surface, is provided in the stage 12. Lens holder 14 extends within the stage opening and is maintained in seated position therein by means of screws 17 which secure its flange 18 to the stage. For the purpose of allowing lens 13 to be placed in immersion contact with an object slide, it is positioned so that its upper surface is slightly below the level of the stage. It is to be observed that by this construction, the front lens is maintained as a distinct unit of the condenser which is physically separated from the back lens of the device.

The lens mounting member 16 for the back lens is in the form of a right angle bracket and is located below the stage in separated position from the front lens. One leg of the member 16 is secured to the microscope stand in a vertical position by means of screws 19 or other suitable fastening means. As may be best observed in Figure 3, the horizontal leg of the lens holding member 16 is provided with a cylindrical opening 20 which extends entirely therethrough. It is within this opening that the refracting bodies of the lens are mounted and it is for this reason that the longitudinal axis of the opening is in coincidence with the optical axis of the front lens 3 of the condenser.

Figure 2:
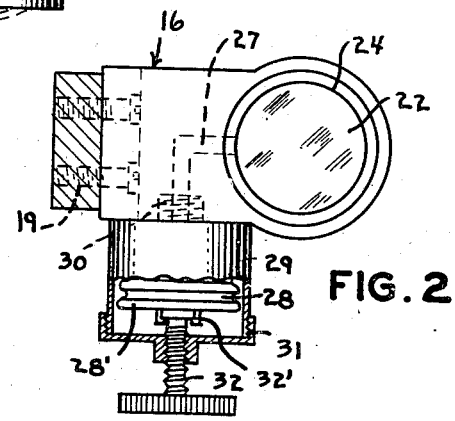
Figure 2 is a plan view of my variable focus lens secured to a support and shows the source of fluid supply for the lens together with the pressure actuated means employed to vary the focus of the device.
Figure 3:
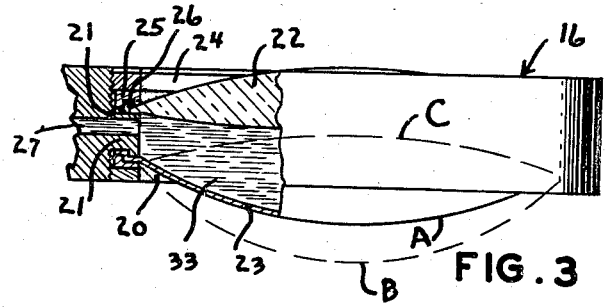
Figure 3 is a fragmentary side elevation, partially in section, of the lens shown in Figure 2.

In the construction disclosed in Figures 1 through 3, two refracting bodies are employed to close the opening 20. To this end the interior of the opening is provided with seats 21 for the refracting bodies 22 and 23. Refracting body 22 is shown as a suitable lens element of glass or other transparent refractive material which has been brought to the desired curvature and finish. The body 22 is of plano-convex shape although it will be well understood that the invention is not limited in its practice to this particular form of refracting body. Body 22 may have surfaces which are convex, concave, plane or any combination of these shapes.

Use is made of a threaded retaining ring 24, which cooperates with a threaded portion within the opening in the manner shown, for holding the lens element 22 on its seat. The ring 24 engages a washer 25 which in turn bears against a gasket 26 adjacent the lens element 22 to provide a fluid tight seal between the lens element and its seat. It is to be noted that the lens element 22 provides a closure for the opening 20 in the lens mounting member.

In the construction shown in Figure 3, a second refracting body is employed to close the end of the opening 20 opposite the lens element 22. For this purpose, use is made of a diaphragm 23 of highly elastic sheet material which is of a transparent nature. The mounting means for the diaphragm 23 includes a construction using a retaining ring, washer and gasket similar to those already described in connection with the mounting of the lens element 22, a fluid tight joint being provided between the seat and the diaphragm. The diaphragm 23 is placed under some slight tension when it is mounted due to the construction of the particular means disclosed for securing it on its seat. Under these circumstances where the material forming the diaphragm is of the flat sheet type, the diaphragm surfaces when undeformed will be substantially perpendicular to the longitudinal axis of the opening 20 in the lens mounting member.

Diaphragm 23 may be formed of a transparent molded plastic which is highly flexible and elastic. Vinylite resins are suitable for this purpose. Polyvinyl acetal, polyvinyl chloride, polyvinyl butyral and mixtures of these compounds may be employed. A sufficient amount of any well known plasticizer is added to the plastic to assure the high degree of elasticity desired in the molded product. The amount of plasticizer used will range in amount from 20% to 35% of the composition of the plastic. With such an amount of plasticizer, a material may be produced which has an elasticity of around as much as one thousand times the elasticity of glass, which latter as is well known is relatively high. Usually the diaphragm is cut from plastic which has been molded into the form of flat sheets of from 0.010 to 0.050 inch thick. In certain instances, however, it may prove desirable to form the diaphragm of material of a thickness similar to that already described but which has already been molded into the form of some curved surface of large radius, such, for example, as a spherical, cylindrical, toric or other surface of weak curvature, rather than cut the diaphragm from a flat sheet. Practice such as that just described falls within the scope of my invention which also comprehends formation of the elastic diaphragm from plastic material which has been molded into other forms and shapes besides those mentioned, and which may be susceptible of use in the manner and for the purpose to be hereinafter pointed out in detail.

As already mentioned, the lens element 22 and the diaphragm 23 close the opening 20 in the horizontal leg of the lens mounting member 16. Since the diaphragm and lens element are arranged in spaced apart relation, it is evident that they provide a compartment within the lens mounting member. This compartment is adapted to contain a suitable fluid and for this purpose is connected to a source of fluid supply by means of a conduit or passageway 27 leading from the interior of the opening 20 to the exterior of the lens mounting member. As shown in Figures 2 and 3, the conduit 27 may be bored, cast or otherwise formed in the lens mounting member in the position disclosed.

The source of fluid supply is carried within a metal bellows 28 mounted in a housing 29 secured to the lens mounting member by a threaded coupling 30 formed on the housing. Coupling 30 engages an enlarged recess tapped in the lens mounting member in a position to surround the end of the conduit 27. An opening in the coupling connects the conduit with the bellows. The end of the bellows housing away from the lens mounting member is provided with a detachable cover 31 having a threaded hub through which the threaded shaft 32 extends. At the outer end of the shaft 32 a suitable hand wheel is provided for rotating the shaft. The end of the bellows adjacent the shaft 32 is formed with a relatively stiff end plate 28'. This end plate 28' and the shaft 32 are coupled together by any well known coupling means, such, for example, as the coupling device 32', in a manner so that rotation of the shaft may be effected without causing rotation of the bellows. The end of the bellows 28 adjacent the lens mounting member may also be provided with an end plate and is fixedly held against movement. Under such circumstances it will be appreciated that upon rotation of the shaft 32 in the proper direction, the bellows may be expanded or collapsed as desired.

It should be noted that the compartment formed in the lens mounting member between the refractive bodies 22 and 23 is sealed and that it and the bellows 28 together with their connecting conduit 27 form a closed system capable of holding a fluid 33. This closed system preferably contains an amount or volume of a suitable transparent fluid which at normal temperature and pressure will be sufficient to completely fill the fluid compartment, conduit and bellows when the latter are in their normal position, that is to say, neither expanded nor collapsed. Gasses as well as liquids are comprehended for use as fluids. Generally, a liquid is preferred since its volume will usually not be affected to the extent of a gas by small temperature changes. The selection of a fluid is limited by certain factors. Firstly, the fluid must be transparent. Secondly, the fluid chosen should preferably be chemically inert and generally unharmful to the construction materials employed to form the variable focus lens, and thirdly, the fluid must have an index of refraction suitable for carrying out the aims and purposes of my invention, among which is the provision of a corrective effect for lens aberration.

As will be well understood by those skilled in the art, there is an extremely wide range of fluids which meet the aforementioned general requirements and which are hence suitable for employment with my invention. Besides these general selection requirements, it should be noted that the index of the material forming the lens element 22 is important in determining what fluids may be employed. For example, where the lens element is formed of glass, it is to be recalled that there are many varieties of optical glass which differ in refractive index. Any one of these varieties of glass may be employed with an elastic diaphragm 23 of a plastic resin having a particular index of refraction. Thus a fluid for the variable focus lens will be chosen having a refractive index which will best produce the optical effects desired when used with a particular lens element of particular refractive index and a diaphragm having a particular index of refraction.

The operation of the lens will be apparent from the foregoing. If the fluid system is filled with fluid in the manner described when the bellows 28 are in their normal position, it will be appreciated that collapsing of the bellows by actuation of screw 32 will force liquid out of the conduit 27 into the fluid compartment. This will increase the volume of fluid and also the pressure in the compartment. Inasmuch as the lens element 22 is of relatively rigid material, the increased pressure will have no material effect upon it. On the other hand, since the diaphragm 23 is of highly elastic material, the force created by the increase in pressure can be expected to deform the diaphragm from its position at normal pressure to some position such as that shown in the full lines and indicated by the reference character A. Continuing to collapse the bellows will further increase the pressure and the volume of the fluid within the compartment and move the diaphragm to a more deformed position such as that shown by the dotted line B.

Expansion of bellows 28 will quite obviously withdraw fluid from the fluid compartment to reduce the volume contained therein and will also lower the internal pressure of the fluid in the compartment. For example, with the bellows collapsed so that the elastic diaphragm is in the dotted position B of Figure 3, continued expansion of the bellows, by suitable operation of screw 32, results in moving the diaphragm through position A to the position it occupies under normal pressure for any particular temperature. The diaphragm, under these just described conditions and at normal temperature, will have a shape substantially the same as that to which it was molded. Where the diaphragm is formed, as shown in Figure 3, of flat sheet material which is placed under some slight amount of tension when fixed to its seat, its refracting surfaces will be substantially perpendicular to the longitudinal axis of the opening 20 in the lens mounting member 16 at normal temperature and pressure. Further expansion of the bellows, beyond that already noted, causes the withdrawal of more fluid from the fluid compartment within the lens mounting member and the creation of a negative pressure therein. Where such is the case, the elastic diaphragm may be deformed into a concave surface such as indicated by the dotted line C.

As is well known, the focal length of a lens is related to its thickness, the curvature of each refracting surface and the index of refraction of the materials which make up the lens. A variation in either of these lens characteristics will cause a change in the focal length of the lens. In the construction disclosed in Figure 3, it may be observed that I have provided a variable focus lens inasmuch as I am able to change at will certain of the above mentioned lens characteristics by varying the curvature of the surfaces of the elastic diaphragm 23.

The lens of Figure 3 is shown in Figure 1 as forming the back lens of a microscope condenser. This lens and the front lens 13 of the condenser, when combined, will have an equivalent focal length. However, variation in the focal length of one of the lens of the combination will produce a variation in the focal length of the condenser. The focal length of a condenser varies inversely with its numerical aperture or N. A. which is a term employed in rating both condensers and objectives. A condenser, as is well known, is employed to illuminate an object undergoing microscopic examination. In practice, a condenser and an objective of like N. A. should be employed to obtain the illumination necessary for optimum working conditions. This, however, requires a microscopist to be supplied with a considerable number of expensive condensers and also frequently entails the tedious procedure necessary to change from one condenser to another. Obviously, these disadvantages are overcome by my invention. While Figure 1 illustrates only one use of my variable focus lens, namely, with a microscope condenser, the advantages and practical benefits to be obtained with such a lens at once become apparent.

It is to be noted that both surfaces of the lens element 22 of Figure 3 may be formed of any one of a number of possible different shapes. Likewise, each refracting surface of the lens element 22 may be given the particular radius of curvature of one of the infinite number of different degree curves of which it is possible to form the surfaces of the lens element. The other lens characteristic mentioned, namely, index of refraction is also susceptible of wide variation for the construction shown in Figure 3 inasmuch as there are many materials and fluids of different refractive index which may be successfully employed to respectively form the lens element 22 and fill the fluid compartment. With such an infinite number of possible combinations of lens characteristics it will be well appreciated that I am able to provide an infinite number of variable focus lenses each having a different focal range, it being understood that by focal range I mean the focal lengths of the lens, possible for practical operation, which lie between and including the focus points nearest to and farthest from the lens, produced on diaphragm deformation.

One object of my invention, as heretofore noted, concerns the correction of a variable focus lens for spherical and chromatic aberrations. As is well known, corrections of this nature are superposed on each other and may be brought about by using two or more components to form the lens, by suitably shaping the surfaces of these components and by the selection of materials having indices of refraction best suited to effect the correction desired. The lens construction of Figure 3 is of a nature which readily lends itself to the application of corrective practices. Quite obviously these practices may be put into effect by giving either surface of the rigid lens element 22 a convex, concave or plane contour as desired and by choosing the fluid 33 and the material for the lens element 22 to each have an index of refraction which will produce the desired corrective effect for the particular combination provided, due regard being given to the index of refraction of the elastic diaphragm 23 and the positions and shapes which it will assume over its working range.

The diaphragm 23 has been shown in Figure 3 as possessing a uniform thickness. Where such is the case, the diaphragm will, when it is deformed, have a curved surface which approximates a curve of a particular radius. This is due to the highly elastic character of the diaphragm which permits its surface to increase in area in deformed positions.

Figure 4:
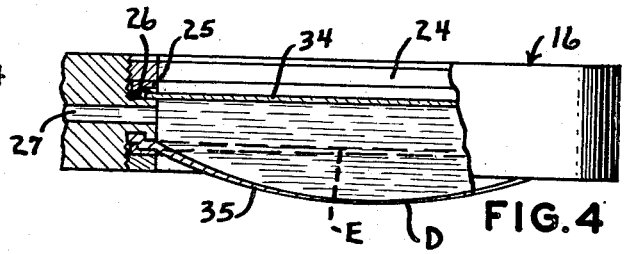
Figure 4 is a side elevation, partially in section, of a lens similar to that of Figure 3 but wherein a diaphragm of varying thickness is employed.

A different type of diaphragm is disclosed in connection with Figure 4 which shows a lens mounting member provided with an opening which is closed by the rigid transparent component or body 34 and an elastic diaphragm 35 of plastic material similar to that already described. It is to be noted that the thickness of the diaphragm 35 increases uniformly from the center of the diaphragm outwardly to its boundary or outer edge. When the diaphragm 35 is deformed, by reason of its special cross section, it will assume a curved surface approximating that of a parabola rather than a surface having a constant radius such as that disclosed in connection with the deformation of the diaphragm 23 of uniform thickness. As an aspheric surface may be utilized in correcting spherical aberration and as a parabolic surface is of an aspheric character, it will be appreciated that in providing a diaphragm like the diaphragm 35 I have furnished another way of effecting a correction for spherical aberration. Deformation of the diaphragm is illustrated in Figure 4 by the full line D which shows the diaphragm 35 in one of the positions possible for it to assume by the control of the volume and the pressure of the fluid within the compartment. The position of diaphragm 35 for normal temperature and pressure is shown by the dotted line E.

In the lens construction of Figure 4 use is made of a bellows similar to that shown in Figures 1 and 2 for controlling the fluid within the fluid compartment of the lens, the latter being connected to the bellows by a suitable conduit. By way of illustration of the fact that my invention is not restricted to the use of a rigid transparent member of any particular shape, it is to be noted that the rigid body 34 is in the form of a plate having plane surfaces.

A further type of diaphragm to be noted, is one formed of material like that previously described but having a cross sectional shape which decreases in thickness from its center outwardly towards its boundary or outer edge. This just mentioned design, which has its thickest portion at the center of the diaphragm, is the opposite of that for the diaphragm 35 of Figure 4 which has its thinnest portion located at its center. For any particular deformation of such a diaphragm, the thick central portion will substantially assume the surface curvature of a surface having a single radius. Aberrations which may be set up in a lens, due to the shape of the diaphragm outside of the thick central portion, may be disregarded if a stop is employed for the zone surrounding the thick central portion. Where this procedure is employed, a very effective variable focus lens may be provided, which in the manner previously explained may be spherically and chromatically corrected for the zone through the lens uncovered by the assumed stop.

The aberration corrections for a variable focus lens having a single fluid compartment are limited to a portion of the deformation range of the elastic diaphragm of the lens. This is due to the fact that the fixed curvature of the surface of the rigid transparent body or lens element will determine the limits of curvature which may be given to the diaphragm to produce the desired lens correction, the curvature of the diaphragm being created while deforming it to vary the focus of the lens. This limitation may be overcome and lens aberrations may be more effectively corrected by making use of a lens construction having a plurality of fluid compartments.

Figure 5:
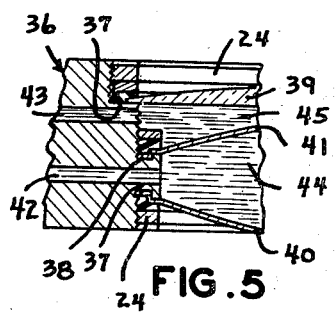
Figure 5 is a fragmentary sectional side elevation showing a modified form of lens construction which makes use of a plurality of fluid compartments.

To carry out the suggestions just above noted, use is made of a lens mounting member 36, shown in Figure 5, which is substantially similar to the member 16. Lens mounting member 36 is provided with the usual opening extending therethrough and with two end seats 37 and an intermediate seat 38. The ends of the opening in the lens mounting member 36 are closed by a lens element 39 and an elastic diaphragm 40 both of which are respectively similar to the lens element 22 and diaphragm 23 of Figure 3. On the intermediate seat 38, there is mounted a second elastic diaphragm 41 which is substantially of the same construction and material as the diaphragms 23 and 40. Suitable retaining ring constructions are employed to hold each diaphragm and the lens element on their respective seats. The securing means just described, which is similar to that shown in Figure 3, affords a fluid tight joint between each diaphragm 40 and 41 and its seat and between the lens element 39 and its seat. Diaphragms 40 and 41 are shown in Figure 5 in deformed positions.

Where the opening in the lens mounting member is closed by a lens element and two elastic diaphragms, it may be noted that two fluid compartments, which are separated and sealed from each other, are formed. Separate conduits 42 and 43 are provided in the lens mounting member 36 for connecting each compartment to a separate source of fluid supply contained in a suitable bellows mechanism similar to that employed in conjunction with the lens of Figures 1 and 2.

The fluids for the compartments may be either liquids or gases, or the fluid used in one compartment may consist of a gas while that used for the other compartment may be a fluid. Fluids 44 and 45 within the closed system, provided by each compartment and its conduit and separate bellows, are chosen in accordance with the index of refraction desired for them, reference being had to the refractive index and shape of the lens element 39 as well as the index of refraction of the diaphragms 40 and 41 and their possible changes in curvature over their deformation range. Utilization of a design which properly incorporates these just mentioned factors results in the provision of a variable focus lens which can be corrected over a relatively wide focal range, location of the focus for such lens being, of course, dependent upon the deformed position of either or both diaphragms.

An appreciation of the many focal adjustments possible for the lens of Figure 5 will be gained when it is considered that fluid may be introduced into or withdrawn from either or both compartments. Where fluid changes are carried out for both compartments, the fluid may be withdrawn or introduced into the compartments in either equal or unequal amounts and this operation may be carried on simultaneously or separately for both compartments. Moreover, the fluid used in both compartments may comprise a gas or a liquid and for that matter the fluid in one compartment may consist of a gas while that in the other compartment may be a liquid. Under these circumstances, such control of the diaphragms 40 and 41 may be obtained that either or both of them may be deformed in a desired manner, it being noted that the particular pressure control means disclosed allows excellent fine adjustment of the diaphragms to produce any particular surface curvature within the working range of the lens. Obviously, this control permits the formation of a great number of combinations of diaphragm positions. Also to be considered are the variations possible for the refractive indices of the fluids 44 and 45 and the rigid transparent body 39 together with the choice of curvature for the latter. By the proper utilization, in good lens design, of the foregoing factors which determine the characteristics of a lens, it will be appreciated that a veritable unlimited number of optical combinations can be provided which are adapted for a considerable number of variable focus lenses of the type disclosed in Figure 5, each one of which is susceptible to correction in its focal range.

Figure 6:
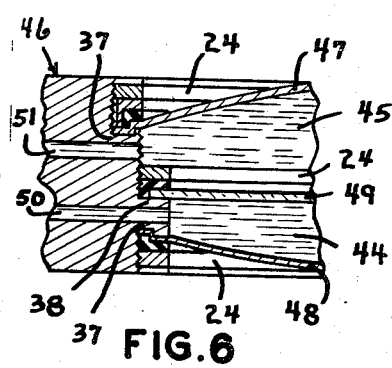
Figure 6 is a fragmentary sectional side elevation showing another modified form of lens construction making use of a plurality of fluid compartments.

A somewhat modified form of lens having a plurality of fluid compartments is shown in Figure 6. The construction therein disclosed incidentally illustrates the fact that my invention is not limited to a structure which locates a rigid transparent body at one end of the opening in a lens mounting member as shown in Figure 5. In Figure 6, a lens mounting member 46 is provided with the usual opening having two end seats and an intermediate seat formed therein. On the end seats there are mounted diaphragms 47 and 48 which are similar to the diaphragms heretofore described while on the intermediate seat there is mounted a rigid transparent plate 49 having plane surfaces. The diaphragms 47 and 48 and plate 49 are secured on their seats by some usual retaining ring construction similar to that heretofore outlined. Conduits 50 and 51 lead from the compartments formed between each diaphragm and the plate 49 to suitable separate sources of fluid supply which are introduced into and withdrawn from each compartment by separate bellows mechanisms, each of which are similar in design to the bellows shown in Fig. 2.

Fluids meeting the requirements heretofore noted are used in the fluid compartments of the lens of Figure 6. Obviously, operation of the modified form of double compartment lens is carried out in accordance with the principles heretofore detailed, it being noted, however, that in this construction either of the diaphragms 47 or 48 are always deformed independently of each other. Thus deformation of one diaphragm will have no effect upon the position occupied by the other diaphragm.

In some instances, it may be desirable to employ the same fluid within both compartments of the lens of Figure 6. Where such is the case both of the conduits are connected to the same instead of a separate bellows mechanism. The single conduit serves as a source of fluid supply for both compartments, the flow of fluid into or out of either compartment being controlled by the use of suitable valves in the conduits in a manner well known to the art. Of course, a construction of this type is not limited to use with a lens of the type shown in Figure 6 but may be employed with the double compartment lens illustrated in Figure 5.

A rigid transparent member or lens element has been disclosed in use with all of the illustrated forms of the invention. It is to be understood, however, that this type of construction is not essential to the practice of my invention as quite obviously elastic diaphragms may be employed to form all of the refracting bodies or members of a lens. Likewise, where the use of a refractive body of the diaphragm type has been shown or described, it will be realized that any other diaphragm having a different form or surface shape and/or different cross section may be substituted for it.

Under certain circumstances of employment, it may be desirable to use a suitable stop, for example, a stop for the marginal rays passing through a lens, with any of the lenses disclosed. Although usage of a stop has not been illustrated, it should be understood that I am not precluded from the employment of any type of such a device with any of the forms of my invention.

From the foregoing it will be realized that not only have I provided variable focus lenses which possess extremely wide focal ranges but also that I have disclosed a design which permits the correction of such lenses for aberrations occurring within their focal ranges. A degree of correction equivalent to that in a highly corrected lens consisting of a multiplicity of separate components and having a fixed focal length is not attempted by the invention. However, it will be apparent that I have approximated this condition not only for a single focal point but for all of the focal points within the focal range of a variable focus lens. The lenses which I have shown are embodied in simple constructions which are easily operated. With such constructions, by forming certain of the refracting surfaces of highly elastic material and by following well known optical principles for correction of aberrations, I am enabled to put my inventive aims into practical effect.

Needless to say, the scope of my invention comprehends other usages for the variable focus lenses besides their employment as microscope condensers. To name a few other uses, it may be noted that any of the lenses disclosed are adaptable as a camera lens, may be used as a projection lens, may also be employed in measuring errors of refraction in the eye as well as in orthoptic training devices and indeed for a great variety of other purposes, as will be readily appreciated by those skilled in the art.

While I have shown and described the preferred embodiment of my invention, I wish it to be understood that I do not confine myself to the precise details of construction herein set forth as it is apparent that they are susceptible to many changes and variations which fall within the spirit of my invention and the scope of the claims hereto appended.

I claim:

A variable focus lens comprising a lens mounting member having an opening extending therethrough, a substantially rigid lens element of transparent material and a plurality of elastic diaphragms of transparent material closing said opening, said lens element and elastic diaphragms being mounted in spaced apart relation to provide separate compartments within said mounting member, a transparent fluid within each compartment, the fluid in different compartments having differing indices of refraction, a source of supply of each fluid carried by the mounting member, each source being connected to a different compartment and force actuated means for selectively controlling the volume and the pressure of the fluid within each compartment to vary the deformation of said elastic diaphragms at will.

EDWARD F. FLINT.